United States Patent
Delgado et al.

(10) Patent No.: US 10,336,475 B1
(45) Date of Patent: Jul. 2, 2019

(54) FLEXIBLE PROPULSION SYSTEM

(71) Applicant: Space Systems/Loral, LLC, Palo Alto, CA (US)

(72) Inventors: Jorge Delgado, San Jose, CA (US); Jeff Aaron Baldwin, Sunnyvale, CA (US); Ronald W. King, San Francisco, CA (US); Bryan Bowdle, Santa Cruz, CA (US); Michelle Karen Rahn, Mountain View, CA (US)

(73) Assignee: Space Systems/Loral, LLC, Palo Alto, CA (US)

( * ) Notice: Subject to any disclaimer, the term of this patent is extended or adjusted under 35 U.S.C. 154(b) by 680 days.

(21) Appl. No.: 14/937,208

(22) Filed: Nov. 10, 2015

(51) Int. Cl.
*B64G 1/40* (2006.01)

(52) U.S. Cl.
CPC .............. *B64G 1/405* (2013.01); *B64G 1/402* (2013.01)

(58) Field of Classification Search
CPC ........ F03H 1/00; F03H 1/0006; F03H 1/0012; F03H 1/0018; F03H 1/0025; F03H 1/0031; F03H 1/0037; F03H 1/0043; F03H 1/005; F03H 1/0056; F03H 1/0062; F03H 1/0068; F03H 1/0075; F03H 1/0081; F03H 1/0087; B64G 1/402; B64G 1/405; B64G 1/406
See application file for complete search history.

(56) References Cited

U.S. PATENT DOCUMENTS

| | | | |
|---|---|---|---|
| 5,485,721 A | 1/1996 | Steenborg | |
| 5,651,515 A * | 7/1997 | Saccoccia | B64G 1/007 244/158.5 |
| 5,819,526 A | 10/1998 | Jackson et al. | |
| 8,763,957 B1 | 7/2014 | Higham et al. | |
| 8,899,527 B2 * | 12/2014 | Allen | B64G 1/64 244/172.2 |
| 9,145,216 B2 | 9/2015 | Gascon et al. | |
| 2003/0025037 A1 | 2/2003 | Mazanek et al. | |
| 2013/0327015 A1 | 12/2013 | Pollet et al. | |

(Continued)

FOREIGN PATENT DOCUMENTS

| | | |
|---|---|---|
| JP | 07071361 A | 3/1995 |
| WO | WO 2010/036291 A2 | 4/2010 |

OTHER PUBLICATIONS

Kamath "Service Life Extension of the ISS Propulsion System Elements Elements" Jul. 2015.*

(Continued)

*Primary Examiner* — Scott J Walthour
*Assistant Examiner* — William L Breazeal
(74) *Attorney, Agent, or Firm* — Weaver Austin Villeneuve & Sampson LLP

(57) ABSTRACT

A spacecraft propulsion system includes at least one chemical thruster operable with a liquid propellant, at least one electric thruster operable with an inert gas, and a first quantity 'n' of pressurant tanks, each of the 'n' pressurant tanks having a substantially identical volume. The propulsion system results from assembling a plurality of subassemblies, such that a first selectable number 'e' of the first quantity of pressurant tanks are manifolded together with the at least one electric thruster, and a second selectable number 'c' of the first quantity of pressurant tanks are manifolded together with the at least one chemical thruster. The first selectable number 'e' is an integer in the inclusive range of 1 to 'n', and c=n−e.

15 Claims, 6 Drawing Sheets

(56) References Cited

U.S. PATENT DOCUMENTS

2015/0106039 A1\* 4/2015 Kwok ..................... G01F 22/02
    702/50
2016/0046395 A1\* 2/2016 Mansour ................. B64G 1/26
    701/13

OTHER PUBLICATIONS

Mailhe "Design of a Hybrid Chemical Electric Propulsion Orbital Transfer Vehicle" 2012.\*

\* cited by examiner

US 10,336,475 B1

FLEXIBLE PROPULSION SYSTEM

TECHNICAL FIELD

This invention relates generally to a spacecraft propulsion system, and particularly to a spacecraft propulsion system that has a flexibly reconfigurable propellant capacity at a late stage of spacecraft integration.

BACKGROUND OF THE INVENTION

The assignee of the present invention manufactures and deploys spacecraft for commercial, defense and scientific missions. On board propulsion systems of such spacecraft are frequently required to perform orbit raising (or transfer). For example, there is frequently a requirement for commercial spacecraft to perform orbit raising from a launch vehicle transfer orbit (or "parking orbit") to, for example, a geosynchronous orbit. Following separation from the launch vehicle, the spacecraft then performs transfer orbit operations to transfer the spacecraft from the parking orbit to the geosynchronous orbit. Certain aspects of orbit raising or described in U.S. Pat. No. 8,763,957, assigned to the assignee of the present invention and hereby incorporated by reference in its entirety into the present application.

Spacecraft propulsion systems generally include thrusters, which may be broadly categorized as either "chemical" or "electric" based on the respective primary energy source for performing these transfer orbit operations.

Chemical thrusters, for example bipropellant thrusters, deliver thrust by converting chemical energy stored in the propellant to kinetic energy delivered to combustion products of the chemical propellant, e.g., a fuel such as monomethyl hydrazine and an oxidizer such as dinitrogen tetroxide. Whether the propellant is a monopropellant or a bipropellant, chemical thrusters deliver thrust by converting chemical energy stored in the propellant to kinetic energy delivered to combustion products of the chemical propellant. Chemical thrusters, as the term is used herein, and in the claims, also include electrothermal thrusters such as arcjets, described for example in U.S. Pat. Nos. 5,485,721 and 5,819,526, that are configured to use electrical energy to increase the temperature, and, therefore, the velocity of the combustion products of chemical propellants.

In contrast, an electric thruster, as the term is used herein, and in the claims, converts electrical energy to propellant kinetic energy substantially without regard to any chemical energy the propellant may possess. For example, an electric thruster may operate by ionizing and accelerating a gaseous propellant, where the propellant is a noble gas of a heavy element, such as xenon or argon. Irrespective of the selected propellant, a negligible amount of thrust results from energy chemically stored in the propellant. The term electric thruster, as used herein and in the claims, encompasses an electrostatic thruster, an electromagnetic thruster, a Hall effect thruster, a wakefield accelerator, and a traveling wave accelerator, for example.

Chemical thrusters suitable for spacecraft propulsion systems may deliver relatively high thrust of 10-1000 newtons, for example, substantially irrespective of spacecraft power limitations, but such thrusters are generally incapable of operating at a specific impulse ($I_{sp}$) higher than 500 seconds. Electric thrusters may operate at an $I_{sp}$ of 1000-4000 seconds, but spacecraft power constraints, at least, practically constrain thrust levels to well less than one newton.

As disclosed in U.S. Pat. No. 9,145,216, assigned to the assignee of the present invention and hereby incorporated by reference in its entirety into the present application, during the course of a typical spacecraft mission there are times that a high thrust, low power thruster is desirable; at other times, however, a low thrust, high $I_{sp}$ thruster is more advantageous. As a result, it is known, as illustrated in FIG. 1, to provide both chemical and electric thrusters on board a single spacecraft, each thruster assigned to a propulsion subsystem having its own dedicated propellants and its own dedicated propellant and pressurant supply arrangements.

As illustrated in FIG. 1, a chemical propulsion subsystem 110 may include any number of chemical thrusters 116 manifolded by way of a control module 115 with fuel tank 113 and oxidizer tank 114. The fuel tank 113 and the oxidizer tank 114 may each be loaded with a desired quantity of liquid propellant, and include an ullage volume, gaseous pressure of which may be regulated by a pressure control module 112. For example the pressure control module 112 may include one or more pressure regulators. Helium (He) stored in pressurant tanks 111 at a high pressure may be reduced in pressure by the pressure control module 112 and delivered to the fuel tank 113 and the oxidizer tank 114.

An electric propulsion subsystem 120 may include any number of electric thrusters 126 manifolded by way of a propellant management assembly (PMA) 122 with propellant tanks 121. Propellant such as xenon (Xe) stored in tanks 121 at a high pressure may be reduced in pressure by the PMA 122 and delivered to the electric thrusters 126.

The arrangement illustrated in FIG. 1 may be separately optimized for particular mission requirements. For example, each of the He tanks 111 and Xe tanks 121 may be separately sized based on a respective anticipated amount of chemical propulsion subsystem operation and electric propulsion subsystem operation.

SUMMARY OF INVENTION

The present inventors have appreciated advantages of configuring each of the chemical propulsion subsystem and the electric propulsion subsystem to include identical tankage for both the helium pressurant of a chemical propulsion subsystem and for storage of xenon for the electric propulsion subsystem. The tankage may be manifolded as required after a mission profile is chosen (e.g., launch vehicle selection is made and a respective amount of chemical and electric orbit raising to be performed is determined).

According to some implementations, an apparatus includes a propulsion system for use on a spacecraft including at least one chemical thruster operable with a liquid propellant, at least one electric thruster operable with an inert gas, and a first quantity 'n' of pressurant tanks, each of the 'n' pressurant tanks having a substantially identical volume. The propulsion system results from assembling a plurality of subassemblies, such that a first selectable number 'e' of the first quantity of pressurant tanks are manifolded together with the at least one electric thruster, and a second selectable number 'c' of the first quantity of pressurant tanks are manifolded together with the at least one chemical thruster. Where 'e' is an integer in the inclusive range of 1 to 'n', c=n−e.

In some examples, each of the pressurant tanks may be interchangeable.

In some examples, each of the pressurant tanks may be substantially identical.

In some examples, a propellant management assembly may be disposed between the at least one electric thruster and the first selectable number 'e' of pressurant tanks.

In some examples, 'e' may be less than 'n'. In some examples a pressure control module is disposed between the at least one chemical thruster and the second selectable number 'c' of pressurant tanks.

In some examples, the propulsion system may be configured to perform orbit raising of the spacecraft from a launch vehicle transfer orbit to a geosynchronous orbit. In some examples, a first amount of the orbit raising may be performed by firing the at least one chemical thruster and a second amount of the orbit raising is performed by firing the at least one electric thruster.

According to some implementations, a method of fabricating a propulsion system for use on a spacecraft includes: assembling a plurality of subassemblies of the spacecraft propulsion system, including a first quantity 'n' of pressurant tanks, at least one chemical thruster operable with a liquid propellant and at least one electric thruster operable with an inert gas, each of the 'n' pressurant tanks having a substantially identical volume; making a first determination of a first selectable number 'e' of the first quantity of pressurant tanks to be manifolded together with the at least one electric thruster; making a second determination of a second selectable number 'c' of the first quantity of pressurant tanks to be manifolded together with the at least one chemical thruster; and fabricating the propulsion system from the plurality of subassemblies in accordance with the first determination and the second determination. The number 'e' is an integer in the inclusive range of 1 to 'n', and c=n–e.

According to some implementations, a spacecraft includes a propulsion system including at least one chemical thruster operable with a liquid propellant, at least one electric thruster operable with an inert gas; and a first quantity 'n' of pressurant tanks, each of the 'n' pressurant tanks having a substantially identical volume. The propulsion system results from assembling a plurality of subassemblies, such that a first selectable number 'e' of the first quantity of pressurant tanks are manifolded together with the at least one electric thruster, and a second selectable number 'c' of the first quantity of pressurant tanks are manifolded together with the at least one chemical thruster. The number 'e' is an integer in the inclusive range of 1 to 'n', and c=n–e.

BRIEF DESCRIPTION OF THE DRAWINGS

Features of the invention are more fully disclosed in the following detailed description of the preferred embodiments, reference being had to the accompanying drawings, in which.

Figure 1:
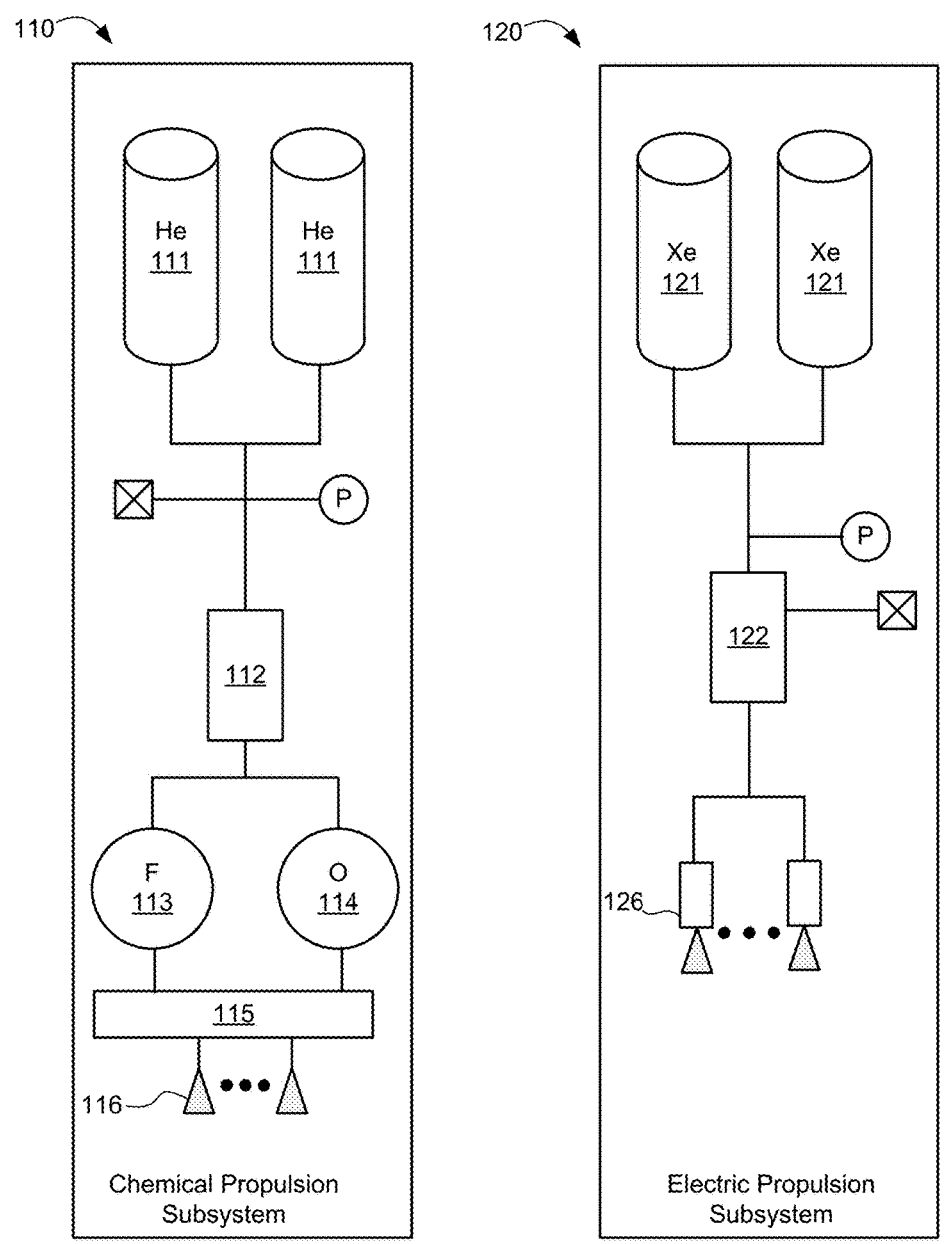
FIG. 1 illustrates an example of chemical and electric propulsion subsystems of the prior art.

Throughout the drawings, the same reference numerals and characters, unless otherwise stated, are used to denote like features, elements, components, or portions of the illustrated embodiments. Moreover, while the subject invention will now be described in detail with reference to the drawings, the description is done in connection with the illustrative embodiments. It is intended that changes and modifications can be made to the described embodiments without departing from the true scope and spirit of the subject invention as defined by the appended claims.

DETAILED DESCRIPTION

Specific exemplary embodiments of the invention will now be described with reference to the accompanying drawings. This invention may, however, be embodied in many different forms, and should not be construed as limited to the embodiments set forth herein. Rather, these embodiments are provided so that this disclosure will be thorough and complete, and will fully convey the scope of the invention to those skilled in the art.

It will be understood that when an element is referred to as being "connected" or "coupled" to another element, it can be directly connected or coupled to the other element, or intervening elements may be present. Furthermore, "connected" or "coupled" as used herein may include wirelessly connected or coupled. It will be understood that although the terms "first" and "second" are used herein to describe various elements, these elements should not be limited by these terms. These terms are used only to distinguish one element from another element. Thus, for example, a first user terminal could be termed a second user terminal, and similarly, a second user terminal may be termed a first user terminal without departing from the teachings of the present invention. As used herein, the term "and/or" includes any and all combinations of one or more of the associated listed items. The symbol "/" is also used as a shorthand notation for "and/or".

The terms "spacecraft", "satellite" and "vehicle" may be used interchangeably herein, and generally refer to any orbiting satellite, interplanetary vehicle, or spacecraft system.

The term "pressurant tank" as used herein, and in the claims, refers to a pressure vessel configured to store a fluid medium in a gaseous or supercritical state at a pressure of 1000 psi or higher. The fluid medium may be a low atomic weight gas such as helium suitable for pressurization of a liquid propulsion subsystem, or a high atomic weight gas, such as xenon or krypton, suitable for use as a propellant in an electric propulsion subsystem.

The present inventors have appreciated advantages of configuring each of the chemical propulsion subsystem and the electric propulsion subsystem to include identical tankage for both the helium pressurant of a chemical propulsion subsystem and for storage of xenon for the electric propulsion subsystem. The tankage may be manifolded as required after a mission profile is chosen (e.g., launch vehicle selection is made and a respective amount of chemical and electric orbit raising to be performed is determined)

The disclosed techniques increase programmatic flexibility in that an amount of bi-propellant and He pressurant intended to be loaded for chemical thruster operations and an amount of xenon propellant intended to be loaded for electric thruster operations may be selected at a later stage in the spacecraft integration process. In some implementations, identically sized composite overwrapped tanks compatible with both He and Xe may be welded into the respective propulsion subsystems only after a mature propellant budget is authored. The tanks may be manifolded so as to provide more or less storage capacity of either He or Xe depending on the propellant budget.

Figure 2:
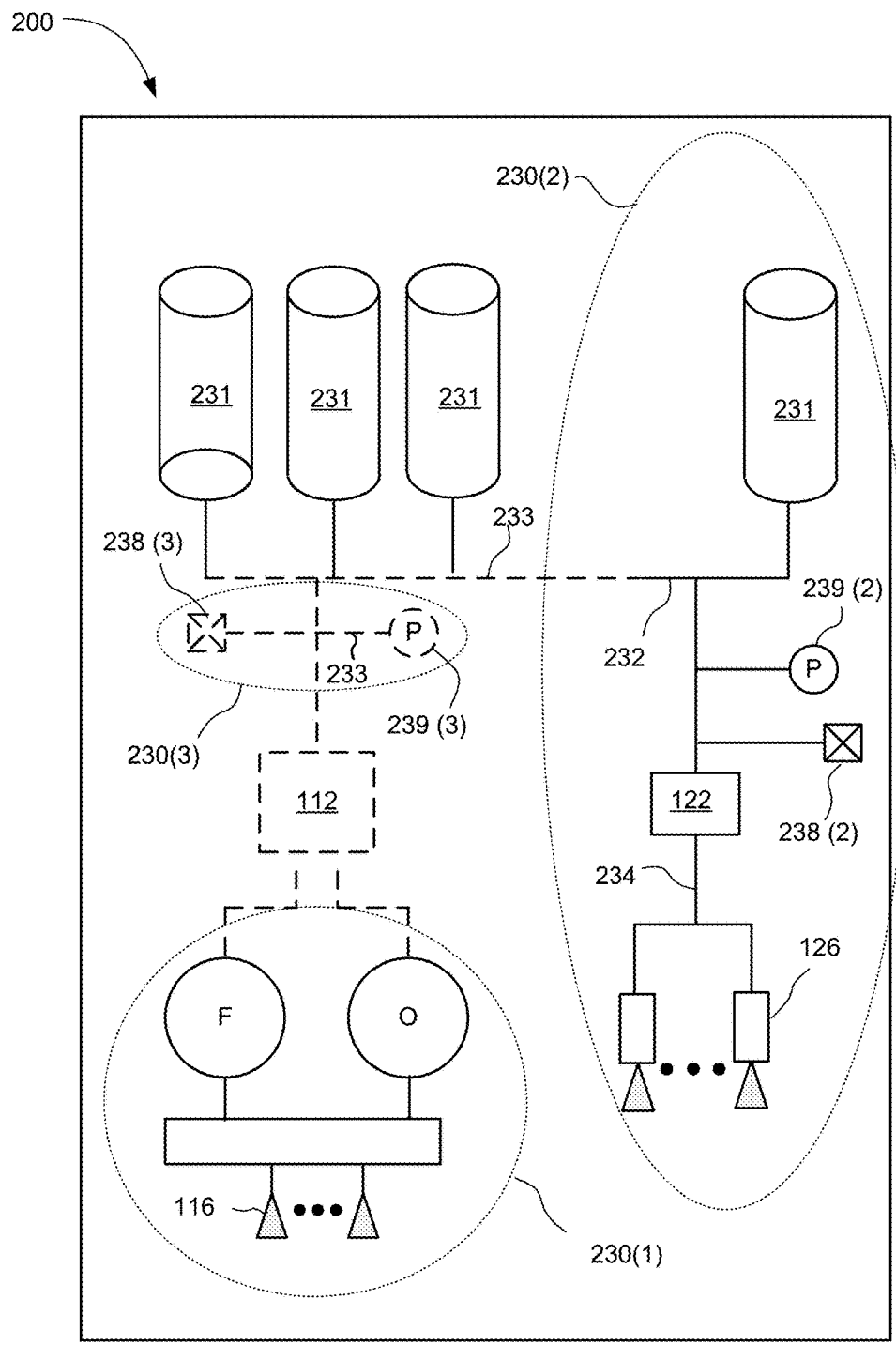
FIG. 2 illustrates a block diagram of a partially assembled spacecraft propulsion system according to an implementation.

FIG. 2 illustrates an implementation of the presently disclosed techniques. In the illustrated implementation, a partially assembled propulsion system 200 includes a number of subassemblies 230(i). In the illustrated implementation, propellant/pressurant lines connecting discrete components within a subassembly 230(i) are represented by solid lines that may be configured as part of the respective subassemblies 230(i). For example, in the illustrated implementation, subassembly 230(2) includes a manifold 232 of one or more pressurant lines that are assembled so as to pneumatically couple a pressurant tank 231 with PMA 122, service valve 238(2) and pressure transducer 239(2). Similarly, in the illustrated implementation, the subassembly 230(2) includes a manifold 234 of one or more propellant lines that are assembled so as to pneumatically couple PMA 122 electric thrusters 126.

Dashed lines in FIG. 2 represent optional components and propellant/pressurant lines that may be incorporated in a subsequent stage of assembly. For example, the pressure control module 112, if required, may be integrated between subassembly 230(1) and subassembly 230(3). In addition, pressurant line 233 may provide a pneumatic coupling between two or more pressurant tanks 231.

Together, the subassemblies 230(i) include a quantity 'n' of pressurant tanks 231. In the illustrated example, the quantity is n=4, but a larger or smaller quantity is within the contemplation of the present disclosure. Advantageously, each of the pressurant tanks 231 may have an identical volume. In some implementations, each of the pressurant tanks 231 is interchangeable. In some implementations, each of the pressurant tanks 231 is identical.

Figure 3:
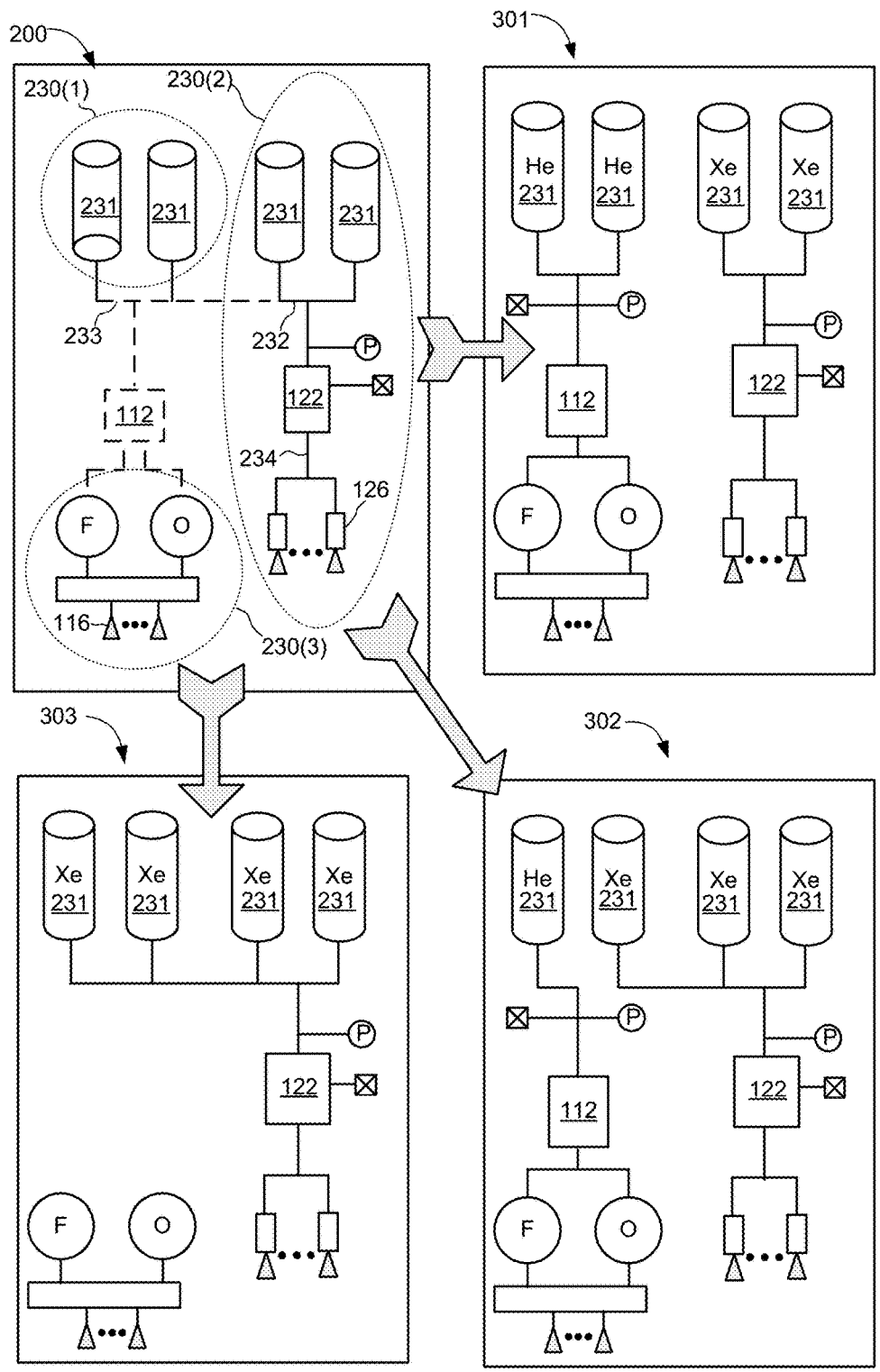
FIG. 3 illustrates techniques for flexibly reconfiguring propellant storage capacity of a spacecraft propulsion system according to an implementation.

It is contemplated that at least some subassemblies 230(i) may be fabricated in advance of choosing a mission profile and of making an associated determination of respective amounts of chemical and electric orbit raising to be performed. Subsequent to making the aforementioned determination, referring now to FIG. 3, the partially assembled propulsion subsystem 200 may be configured into a selected one of, for example, fully assembled propulsion subsystems 301, 302, and 303.

Thus, for a mission profile that contemplates a relatively large portion of chemical orbit raising to be performed, a configuration such as illustrated by fully assembled propulsion subsystem 301 may be selected, wherein two of the four pressurant tanks 231 are manifolded together with one or more chemical thrusters 116. More particularly, in the illustrated fully assembled propulsion subsystem 301, two pressurant tanks 231 are pneumatically coupled, by way of the pressure control module 112, with the fuel (F) tank and oxidizer (O) tank, and may be loaded with helium (He) or other suitable pressurant. The remaining two of the four pressurant tanks 231 are manifolded together with one or more electric thrusters 126. More particularly, in the illustrated fully assembled propulsion subsystem 301, two pressurant tanks 231 are pneumatically coupled with the PMA 122, and may be loaded with xenon (Xe) or other propellant suitable for electric thrusters 126.

Contrariwise, for a mission profile that contemplates a relatively large portion of electric orbit raising to be performed, a configuration such as illustrated by fully assembled propulsion subsystem 303 may be selected, wherein each of the four pressurant tanks 231 are manifolded together with the electric thrusters 126, together with the PMA 122. In such a configuration, fuel and oxidizer tanks may be anticipated to operate in a "blowdown" such that an additional pressurant ullage volume and an associated pressure control module may be omitted. Accordingly, it may be observed that fully assembled propulsion subsystem 303 omits a pressure control module and that all of the pressurant tanks 231 of fully assembled propulsion subsystem 303 may be loaded with Xe and pneumatically coupled with PMA 122.

As a yet further example, for a mission profile that contemplates an intermediate amount of chemical and electric orbit raising to be performed, a configuration such as illustrated by fully assembled propulsion system 302 may be selected, wherein one of the four pressurant tanks 231 is coupled, by way of the pressure control module 112, with the fuel (F) tank and the oxidizer (O) tank, and may be loaded with helium (He) or other suitable pressurant. The remaining three of the four pressurant tanks 231 are pneumatically coupled with the PMA 122 and may be loaded with xenon propellant suitable for electric thrusters 126.

More generally, it may be contemplated that a spacecraft propulsion system includes a first quantity 'n' of pressurant tanks, each having a substantially identical volume. A first selectable number 'e' of the first quantity of pressurant tanks may be manifolded together with at least one electric thruster, and a second selectable number 'c' of the first quantity of pressurant tanks may be manifolded together with at least one chemical thruster. Where 'e' is in the inclusive range of 1 to 'n', c=n−1. Referring again to FIG. 3, it may be observed that, for the illustrated fully assembled propulsion subsystem 301, n=4, e=2 and c=2. For the illustrated fully assembled propulsion subsystem 302, n=4, e=3 and c=1. For the illustrated fully assembled propulsion subsystem 303, n=4, e=4 and c=0.

Figure 4:
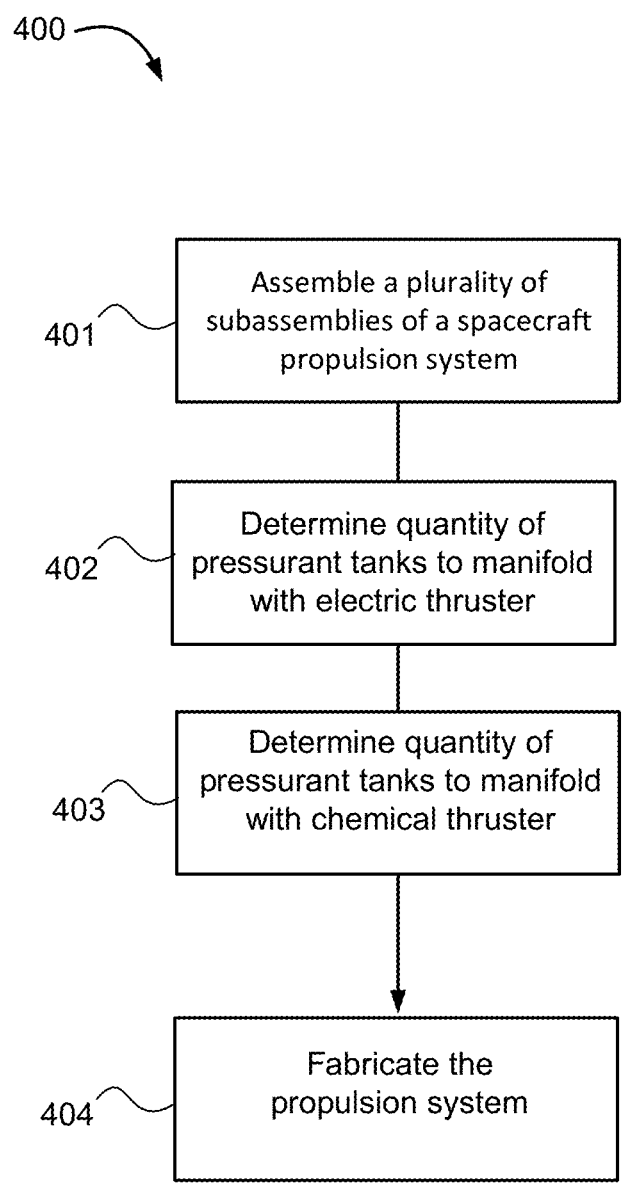
FIG. 4 shows an example of a process flow for of fabricating a propulsion system for use on a spacecraft, according to an implementation.

FIG. 4 shows an example of a process flow for of fabricating a propulsion system for use on a spacecraft. The process 400 may begin, at block 401, by assembling a plurality of subassemblies of the spacecraft propulsion system. Together, the subassemblies may include a first quantity 'n' of pressurant tanks, at least one chemical thruster operable with a liquid propellant and at least one electric thruster operable with an inert gas. As indicated hereinabove, the 'n' pressurant tanks, advantageously, have a substantially identical volume. The pressurant tanks may be interchangeable, in some implementations, or substantially identical.

At block 402, a determination may be made as to a quantity ('e') of pressurant tanks to manifold with the at least one electric thruster. The quantity 'e' of pressurant may be may be in the inclusive range of one to 'n', and may be selected at a relatively late stage of spacecraft integration, after generation of a mature mission profile.

At block 403, a determination may be made as to a quantity ('c') of pressurant tanks to manifold with the at least one chemical thruster. The quantity 'c' may equal n−e.

At block 404, the propulsion system may be fabricated, using the determined quantities of pressurant tanks.

Figure 5:
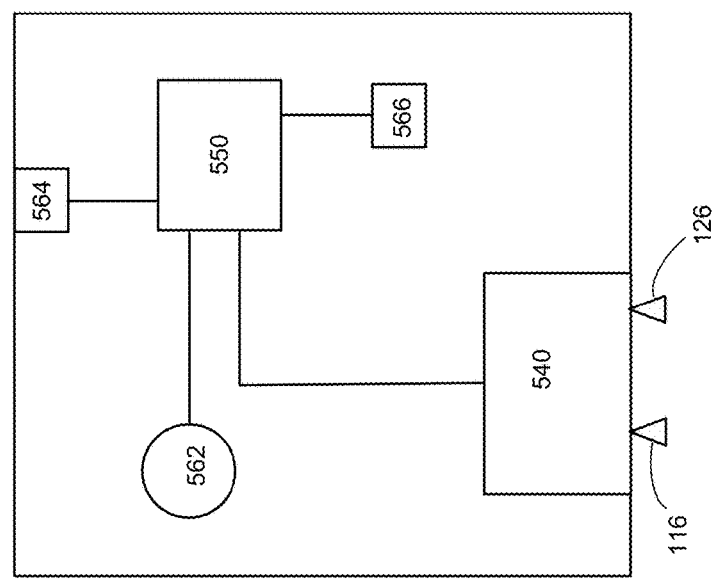
FIG. 5 depicts a simplified block diagram of a spacecraft, according to an implementation

The propulsion system may be configured to perform orbit raising of a spacecraft from a launch vehicle transfer orbit to a geosynchronous orbit. A simplified block diagram of such a spacecraft is illustrated in FIG. 5. In the illustrated implementation, a spacecraft 500 includes a propulsion subsystem 540 and spacecraft controller 550. Propulsion subsystem 540 may include propulsion equipment, such as tankage and control and service devices (not illustrated) and at least one chemical thruster 116 and at least one electric thruster 126. In the illustrated implementation, the spacecraft controller 550 is communicatively coupled with propulsion system 540, momentum storage system 562, start tracker 564 and inertial sensor 566.

Spacecraft controller 550 may be configured to cause the propulsion subsystem to perform one or more orbit raising maneuvers. Each orbit raising maneuver may include either or both of a chemical thruster firing and an electric thruster firing. Two consecutive orbit raising maneuvers may be separated by a respective intervening coast period.

Figure 6:
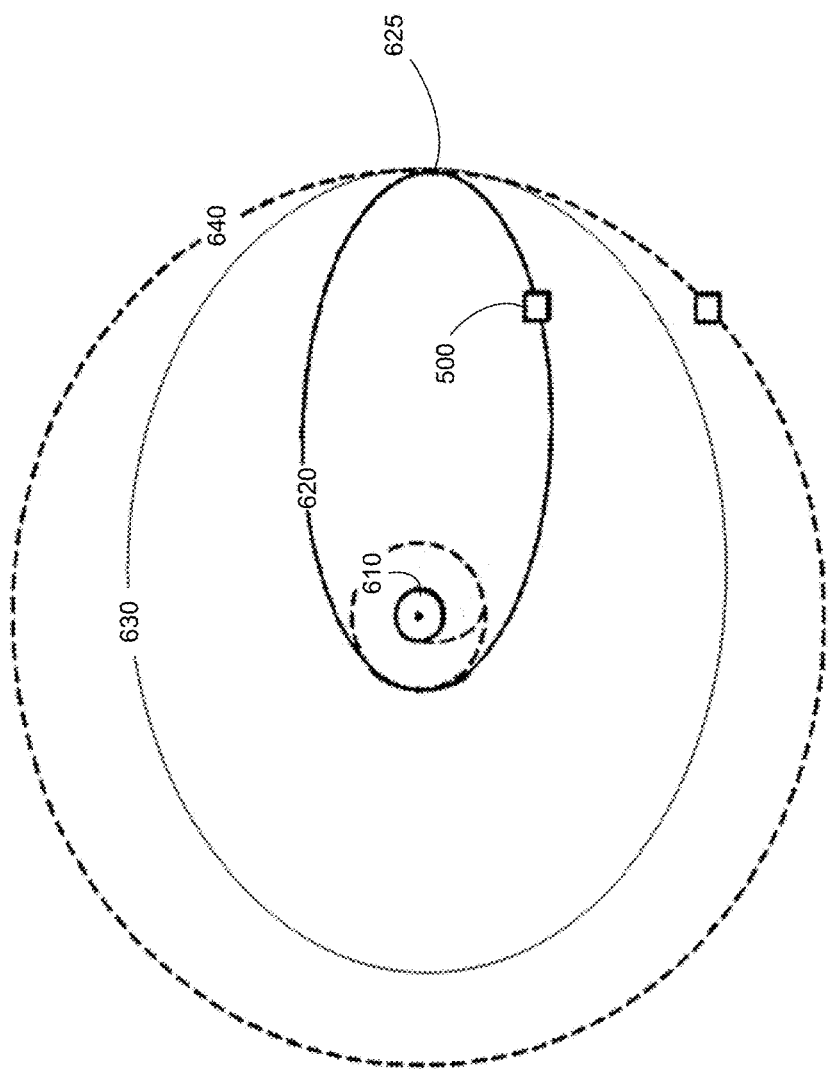
FIG. 6 illustrates an example of spacecraft orbit raising techniques.

The term "orbit raising" as used herein, and in the claims, may be better appreciated by referring to FIG. 6. Spacecraft 500 may ordinarily be inserted by a launch vehicle into transfer orbit 620 about earth 610. Transfer orbit 620 may be elliptical, as illustrated, with an apogee altitude approximately equal to the altitude of the intended final orbit 640 and with a perigee altitude substantially lower than the intended final orbit 640. Orbit raising maneuvers may be executed near the apogee 625 in order to raise the perigee altitude and circularize the orbit. Two or more such orbit raising maneuvers may be contemplated. In the illustrated example, intermediate orbit 630 may result from a first orbit raising maneuver. Following a coast period, a second orbit raising maneuver may be executed to place the spacecraft into intended final orbit 640.

Thus, a spacecraft propulsion system that has a flexibly reconfigurable propellant capacity at a late stage of spacecraft integration has been disclosed. The foregoing merely illustrates principles of the invention. It will thus be appreciated that those skilled in the art will be able to devise numerous systems and methods which, although not explicitly shown or described herein, embody said principles of the invention and are thus within the spirit and scope of the invention as defined by the following claims.

What is claimed is:

1. An apparatus comprising:
    a propulsion system for use on a spacecraft including:
    at least one chemical thruster operable with a liquid propellant;
    at least one electric thruster operable with a high atomic weight inert gas; and
    a first quantity 'n' of identically sized pressurant tanks;
    wherein:
    the propulsion system results from assembling a plurality of subassemblies, such that a first selectable number 'e' of the first quantity of identically sized pressurant tanks are manifolded together with the at least one electric thruster and loaded with the high atomic weight inert gas such that the at least one electric thruster is provided with the high atomic weight inert gas, and a second selectable number 'c' of the first quantity of identically sized pressurant tanks are manifolded together with the at least one chemical thruster and loaded with helium or other low atomic weight pressurant;
    'e' is an integer;
    c=n−e; and
    'e' is less than 'n' and greater than zero.

2. The apparatus of claim 1, wherein each of the first quantity of identically sized pressurant tanks is interchangeable.

3. The apparatus of claim 1, wherein a propellant management assembly is disposed between the at least one electric thruster and the first selectable number 'e' of the first quantity of identically sized pressurant tanks.

4. The apparatus of claim 1, wherein a pressure control module is disposed between the at least one chemical thruster and the second selectable number 'c' of the first quantity of identically sized pressurant tanks.

5. The apparatus of claim 1, wherein the propulsion system is configured to perform orbit raising of the spacecraft from a launch vehicle transfer orbit to a geosynchronous orbit.

6. The apparatus of claim 5, wherein a first amount of the orbit raising is performed by firing the at least one chemical thruster and a second amount of the orbit raising is performed by firing the at least one electric thruster.

7. A method of fabricating a propulsion system for use on a spacecraft, the method comprising:
    assembling a plurality of subassemblies of the propulsion system, including a first quantity 'n' of identically sized pressurant tanks, at least one chemical thruster operable with a liquid propellant and at least one electric thruster operable with a high atomic weight inert gas;
    making a first determination of a first selectable number 'e' of the first quantity of identically sized pressurant tanks to be manifolded together with the at least one electric thruster and loaded with the high atomic weight inert gas such that the at least one electric thruster is provided with the high atomic weight inert gas;
    making a second determination of a second selectable number 'c' of the first quantity of identically sized pressurant tanks to be manifolded together with the at least one chemical thruster and loaded with helium or other low atomic weight pressurant; and
    fabricating the propulsion system from the plurality of subassemblies in accordance with the first determination and the second determination; wherein
    'e' is an integer;
    c=n−e; and
    'e' is less than 'n' and greater than zero.

8. The method of claim 7, wherein each of the identically sized pressurant tanks is interchangeable.

9. The method of claim 7, wherein a propellant management assembly is disposed between the at least one electric thruster and the first selectable number 'e' of the first quantity of identically sized pressurant tanks.

10. The method of claim 7, wherein a pressure control module is disposed between the at least one chemical thruster and the second selectable number 'c' of the first quantity of identically sized pressurant tanks.

11. The method of claim 7, wherein the propulsion system is configured to perform orbit raising of the spacecraft from a launch vehicle transfer orbit to a geosynchronous orbit.

12. The method of claim 11, wherein a first amount of the orbit raising is performed by firing the at least one chemical thruster and a second amount of the orbit raising is performed by firing the at least one electric thruster.

13. A spacecraft comprising:
    a propulsion system including:
    at least one chemical thruster operable with a liquid propellant;
    at least one electric thruster operable with a high atomic weight inert gas; and
    a first quantity 'n' of identically sized pressurant tanks;
    wherein:
    the propulsion system results from assembling a plurality of subassemblies, such that a first selectable number 'e' of the first quantity of identically sized pressurant tanks are manifolded together with the at least one electric thruster and loaded with the high atomic weight inert gas such that the at least one electric thruster is provided with the high atomic weight inert gas, and a second selectable number 'c' of the first quantity of identically sized pressurant tanks are manifolded together with the at least one chemical thruster and loaded with helium or other low atomic weight pressurant;
    'e' is an integer c=n−e; and
    'e' is less than 'n' and greater than zero.

14. The spacecraft of claim 13, wherein the propulsion system is configured to perform orbit raising of the spacecraft from a launch vehicle transfer orbit to a geosynchronous orbit.

15. The spacecraft of claim 14, wherein a first amount of the orbit raising is performed by firing the at least one chemical thruster and a second amount of the orbit raising is performed by firing the at least one electric thruster.

* * * * *